United States Patent
Yamamoto et al.

(10) Patent No.: US 6,829,210 B2
(45) Date of Patent: Dec. 7, 2004

(54) OPTICAL HEAD AND OPTICAL PICKUP

(75) Inventors: Kenji Yamamoto, Kanagawa (JP); Kiyoshi Osato, Chiba (JP); Fumisada Maeda, Tokyo (JP)

(73) Assignee: Sony Corporation (JP)

( * ) Notice: Subject to any disclaimer, the term of this patent is extended or adjusted under 35 U.S.C. 154(b) by 309 days.

(21) Appl. No.: 09/947,472

(22) Filed: Sep. 7, 2001

(65) Prior Publication Data

US 2002/0034148 A1 Mar. 21, 2002

(30) Foreign Application Priority Data

Sep. 14, 2000 (JP) .................................. P2000-280359

(51) Int. Cl.[7] .............................................. G11B 7/135
(52) U.S. Cl. ................................................ 369/112.24
(58) Field of Search ................................... 369/112.24

(56) References Cited

U.S. PATENT DOCUMENTS

| | | | |
|---|---|---|---|
| 5,177,640 A | 1/1993 | Grassens | |
| 5,463,501 A | 10/1995 | Suzuki | |
| 5,561,648 A | 10/1996 | Song | |
| 5,691,971 A * | 11/1997 | Kim | 369/94 |
| 5,712,842 A * | 1/1998 | Yamamoto et al. | 369/112.26 |
| 5,933,405 A | 8/1999 | Song | |
| 6,055,113 A * | 4/2000 | Yamamoto et al. | 359/661 |
| 6,104,691 A * | 8/2000 | Yamamoto et al. | 369/118 |
| 6,160,768 A * | 12/2000 | Yanagawa | 369/13.32 |
| 6,272,079 B1 * | 8/2001 | Kanto et al. | 369/44.14 |
| 6,292,453 B1 * | 9/2001 | Ichimura et al. | 369/112.24 |
| 6,549,346 B2 * | 4/2003 | Wada et al. | 359/814 |
| 6,594,204 B1 * | 7/2003 | Yamamoto et al. | 369/44.14 |

FOREIGN PATENT DOCUMENTS

| | | | | |
|---|---|---|---|---|
| EP | 000863502 A2 * | 9/1998 | | G11B/7/135 |
| JP | 11-203706 | * | 7/1999 | G11B/7/125 |

* cited by examiner

*Primary Examiner*—Aristotelis M Psitos
(74) *Attorney, Agent, or Firm*—Rader, Fishman & Grauer PLLC; Ronald P. Kananen

(57) ABSTRACT

An optical head has achromatic lenses which a blue or blue-violet laser beam from a laser diode strikes, object lenses for condensing the laser beam passing through the achromatic lenses on an optical disc, lens holders and for holding the achromatic lenses and the object lenses so that their optical axes coincide, and actuators and for moving the lens holders in the focus direction and/or tracking direction of the optical disc. The lens holders are fixed to each other and the lenses are moved as one part by the actuators.

6 Claims, 10 Drawing Sheets

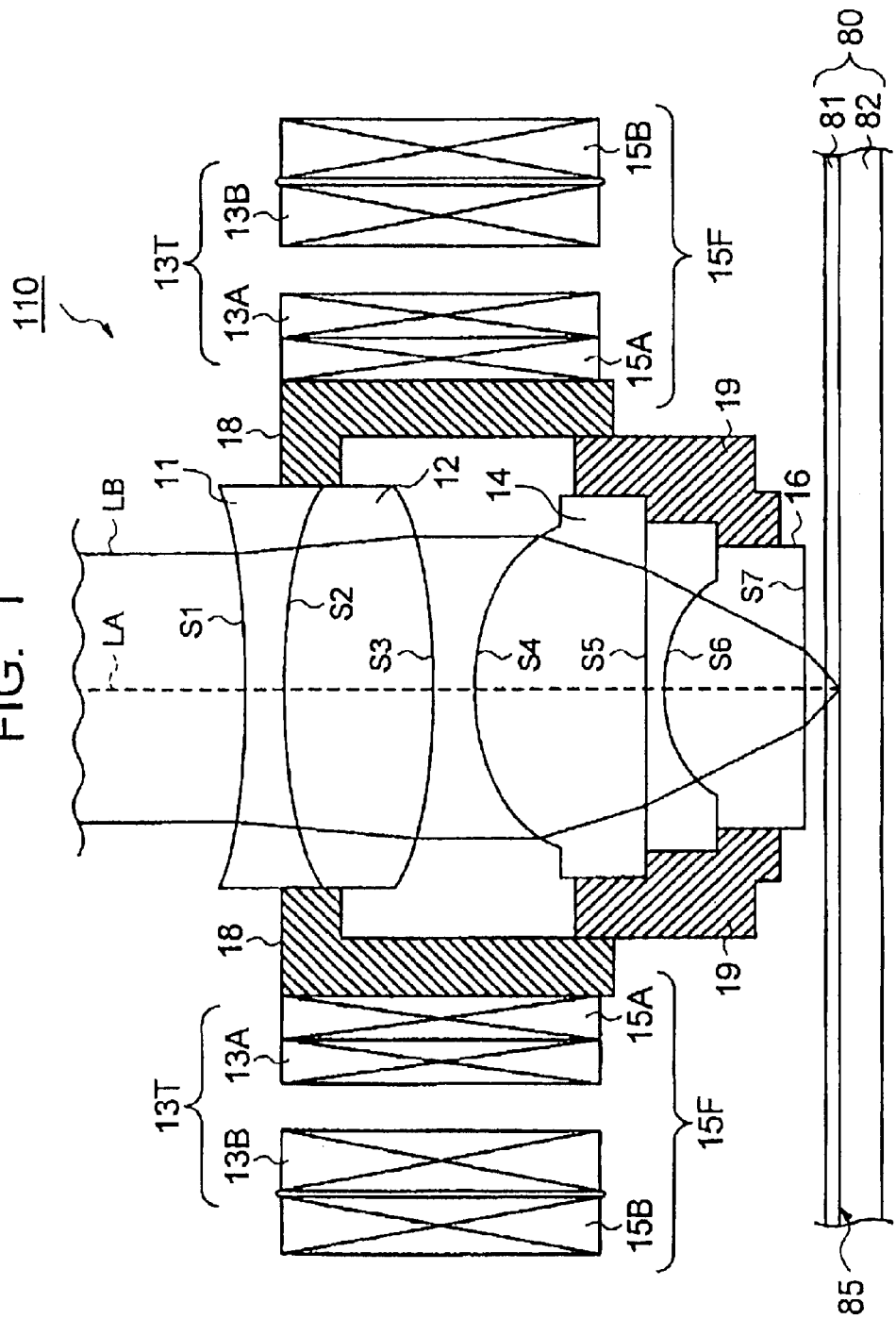

FIG. 2

| OBJECT LENS NA / FOCAL LENGTH / ENTRANCE PUPIL φ (0.85 / 1.61mm / 2.74mm) | | WAVELENGTH λ = 405 nm | | |
|---|---|---|---|---|
| SURFACE | RADIUS OF CURVATURE [mm] | AXIAL DISTANCE [mm] | VITREOUS MATERIAL | REFRACTIVE INDEX IN 405nm |
| S1 | −12.527 | 0.6 | S-TIH4_OHARA | 1.806362 |
| S2 | 9.72447 | 1.2 | S-FPL51_OHARA | 1.507170 |
| S3 | −5.81152 | 0.2 | | |
| S4 (STO) | R: 1.68783<br>K: −0.667189<br>A: 0.406199 × E-2<br>B: −0.2573314 × E-3 | 1.70000 | FCD1_HOYA | 1.505327 |
| | C: 0.882582 × E-4<br>D: −0.135952 × E-3<br>E: 0.901189 × E-6<br>F: 0.149379 × E-4<br>G: −0.470536 × E-5 | | | |
| S5 | R: 22.81189<br>K: −9.484633<br>A: −0.724296 × E-3<br>B: −0.145391 × E-2 | 0.431922 | | |
| | C: 0.991385 × E-3<br>D: −0.404631 × E-4<br>E: 0.0<br>F: 0.0 | | | |
| S6 | R: 1.1587<br>K: −0.168812<br>A: −0.621577 × E-2<br>B: −0.238516 × E-2 | 1.184974 | BACD5_HOYA | 1.605256 |
| | C: −0.706222 × E-3<br>D: −0.838563 × E-2<br>E: 0.0<br>F: 0.0 | | | |
| S7 | 8 | — | | |

FIG. 3

| VITREOUS MATERIAL \ WAVELENGTH | 406 [nm] | 405 [nm] | 404 [nm] |
|---|---|---|---|
| S-TIH4_OHARA | 1.805801 | 1.806362 | 1.806928 |
| S-FPL51_OHARA | 1.507074 | 1.507170 | 1.507267 |
| FCD1_HOYA | 1.505234 | 1.505327 | 1.505421 |
| BACD5_HOYA | 1.605102 | 1.605256 | 1.605412 |
| PC | 1.6 | 1.6 | 1.6 |

OPTICAL HEAD AND OPTICAL PICKUP

BACKGROUND OF THE INVENTION

1. Field of the Invention

The present invention relates to an optical head and an optical pickup having an optical head.

2. Description of the Related Art

U.S. patent application Ser. No. 09/336,505 shows an invention of a chromatic aberration correcting element and an optical pickup apparatus provided with it.

It is desired to shorten a wavelength of an output light beam of a light source of an optical pickup in order to increase the storage capacity of an optical disc. For example, for a compact disc (CD), the wavelength of the output light beam of the laser diode is about 780 nm, while for a digital versatile disc (DVD), which has a larger storage density than a CD, the wavelength of the output light beam of the laser diode is about 650 nm.

Recently, mounting of a laser diode (LD) emitting a blue or blue-violet laser beam of about 405 nm wavelength to an optical pickup is being considered.

When the wavelength of a laser diode is made shorter than 450 nm, generally a lens easily gives rise to chromatic aberration. Therefore, it is preferable to arrange an achromatic lens for correcting the chromatic aberration on the optical path so as to cancel the chromatic aberration of said lens.

SUMMARY OF THE INVENTION

An object of the present invention is to provide an optical head having an achromatic lens and an optical pickup having this optical head.

A first optical head according to the present invention has an achromatic lens which a laser beam strikes, an object lens for condensing said laser beam passing through said achromatic lens on an optical disc, a lens holder for holding said achromatic lens and said object lens so that their optical axes coincide, and an actuator for moving said lens holder which holds said achromatic lens and said object lens in a focus direction and/or tracking direction of said optical disc.

In the first optical head according to the present invention, preferably said lens holder comprises a first lens holder for holding said achromatic lens and a second lens holder for holding said object lens, and said first and second lens holders are fixed to each other so that optical axes of said achromatic lens and said object lens coincide or substantially coincide.

In the first optical head according to the present invention, preferably said laser beam striking said achromatic lens is a blue or blue-violet laser beam output from a laser diode.

A second optical head according to the present invention comprises an achromatic lens which a laser beam strikes, an object lens for condensing said laser beam passing through said achromatic lens on an optical disc, a first actuator for moving said achromatic lens and said object lens in a tracking direction of said optical disc, and a second actuator for moving said object lens, among said achromatic lens and said object lens, in a focus direction of said optical disc.

The second optical head according to the present invention preferably comprises a first lens holder for holding said achromatic lens, a second lens holder for holding said object lens, and an elastic member interposed between said first lens holder and said second lens holder.

In the second optical head according to the present invention, preferably said laser beam striking said achromatic lens is a blue or blue-violet laser beam output from a laser diode.

A first optical pickup according to the present invention comprises a laser, an optical head for condensing a laser beam from said laser on an optical disc, and a photodetector for receiving said laser beam reflected at said optical disc, wherein said optical head has an achromatic lens which said laser beam from said laser strikes, an object lens for condensing said laser beam passing through said achromatic lens on said optical disc, a lens holder for holding said achromatic lens and said object lens so that their optical axes coincide, and an actuator for moving said lens holder which holds said achromatic lens and said object lens in a focus direction and/or tracking direction of said optical disc.

In the first optical pickup according to the present invention, preferably said lens holder comprises a first lens holder for holding said achromatic lens and a second lens holder for holding said object lens, and said first and second lens holders are fixed to each other so that optical axes of said achromatic lens and said object lens coincide or substantially coincide.

In the first optical pickup according to the present invention, preferably, said laser is a laser diode generating a blue or blue-violet laser beam.

A second optical pickup according to the present invention has a laser, an optical head for condensing a laser beam from said laser on an optical disc, and a photodetector for receiving said laser beam reflected at said optical disc, wherein said optical head has an achromatic lens which said laser beam from said laser diode strikes, an object lens for condensing said laser beam passing through said achromatic lens to said optical disc, a first actuator for moving said achromatic lens and said object lens in a tracking direction of said optical disc, and a second actuator for moving said object lens between said achromatic lens and object lens in a focus direction of said optical disc.

In the second optical pickup according to the present invention, preferably said optical head comprises a first lens holder for holding said achromatic lens, a second lens holder for holding said object lens, and an elastic member interposed between said first lens holder and said second lens holder.

In the second optical pickup according to the present invention, preferably said laser is a laser diode generating a blue or blue-violet laser beam.

In the above described first and second optical heads according to the present invention, since the object lens condenses a laser beam passing through an achromatic lens for correcting chromatic aberration on an optical disc, the chromatic aberration of the object lens can be reduced and it is possible to improve the performance of an optical head.

BRIEF DESCRIPTION OF THE DRAWINGS

These and other objects and features of the present invention will become clearer from the following description of the preferred embodiments given with reference to the accompanying drawings, in which:

FIG. 1 is a schematic structural view of a first embodiment of an optical head according to the present invention;

FIG. 2 is a first explanatory table showing characteristics of the lenses in FIG. 1;

FIG. 3 is a second explanatory table showing characteristics of the lenses in FIG. 1;

DESCRIPTION OF THE PREFERRED EMBODIMENTS

Figure 4:
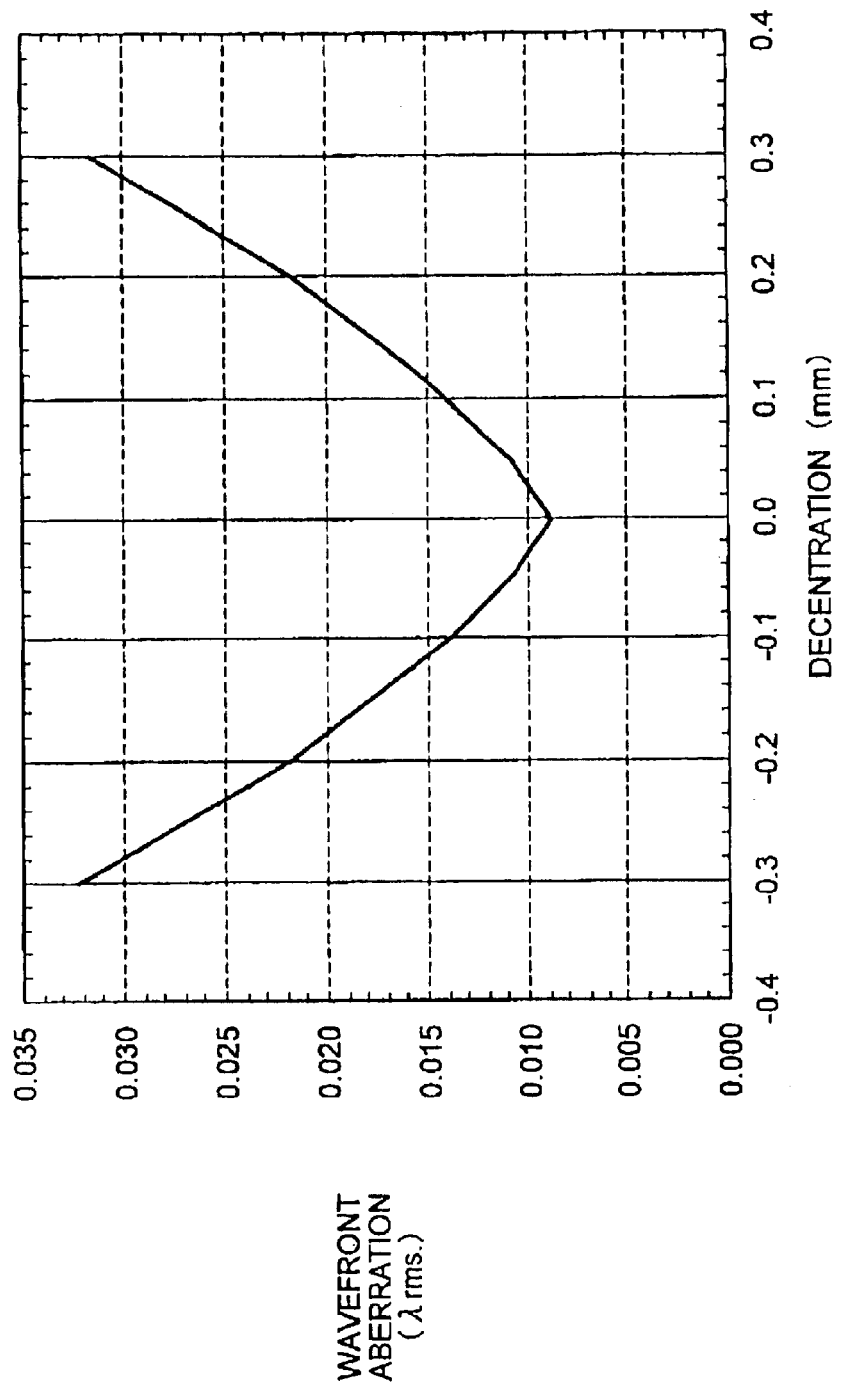
FIG. 4 is a characteristic graph showing a relation between decentration of an achromatic lens and an object lens and a wavefront aberration in the optical head in FIG. 1.

Below, embodiments of the present invention will be explained with reference to the accompanying drawings.

Optical Head 110

FIG. 1 is a schematic structural view of a first embodiment of an optical head according to the present invention.

This optical head 110 has a concave lens 11, convex lenses 12, 14, and 16, a first lens holder 18, a second lens holder 19, a focusing actuator 15F, and a tracking actuator 13T.

The concave lens 11 and the convex lens 12 configure an achromatic lens for correcting chromatic aberration of the object lens and are held by the first lens holder 18.

The convex lenses 14 and 16 configure an object lens and are held by the second lens holder 19. The numerical aperture NA of this object lens is about 0.85.

These lenses 11, 12, 14, and 16 are held by the first and the second lens holders 18 and 19 so that their optical axes coincide or substantially coincide.

The inner wall of the first lens holder 18 and the outer wall of the second lens holder 19 are fixed to each other. On the outer circumference of the first lens holder 18, coils 13A and 15A are provided.

The tracking actuator 13T is configured by the coil 13A and a magnet 13B arranged near this coil 13A in a noncontacting state. By this tracking actuator 13T, the lenses 11, 12, 14, and 16 are moved as one part in a tracking direction (radial direction or substantially radial direction) of an optical disc 80 for tracking servo.

The focusing actuator 15F is configured by the coil 15A and a magnet 15B arranged near this coil 15A in a noncontacting state. By this focusing actuator 15F, the lenses 11, 12, 14, and 16 are moved as one part in a focus direction perpendicular or substantially perpendicular to a recording surface of the optical disc 80 for focus servo.

By the focusing actuator 15F and the tracking actuator 13T, a bi-axial actuator is configured.

A laser beam LB comprised of parallel light is supplied to a refractive surface S1 of the concave lens 11. In the concave lens 11, the opposite side of the refractive surface S1 is fixed to a surface S2 of the convex lens 12. The wavelength of the laser beam LB is, for example, made 405 nm or substantially 405 nm.

The concave lens 11 passes the laser beam striking it from the refractive surface S1 and supplies it to the refractive surface S2 of the convex lens 12.

The convex lens 12 passes the laser beam striking it from the refractive surface S2, emits a laser beam comprised of parallel light from a reflective surface S3, and supplies this laser beam comprised of parallel light to a refractive surface S4 of the convex lens 14.

The convex lens 14 passes the laser beam striking it from the refractive surface S4, emits it from a refractive surface S5, and supplies the striking laser beam to a refractive surface S6 of the convex lens 16.

The convex lens 16 passes the laser beam striking it from the refractive surface S6, emits it from a flat refractive surface S7, and supplies the striking laser beam to a track of a recording surface 85 of the optical disc 80. Thus, the laser beam LB striking the optical head 110 is condensed on the recording surface 85 of the optical disc 80.

The optical disc 80 is, for example, a DVD. The recording surface 85 is positioned between a first disc substrate 81 and a second disc substrate 82. The material of the first and the second disc substrates 81 and 82 is polycarbonate (PC) as one example, and the refractive index n is about 1.6. The second disc substrate 82 is, for example, made an overcoat.

The thickness of the polycarbonate of the first disc substrate 81 is made about 0.1 mm as one example, the thickness of the second disc substrate 82 is made about 1.2 mm as one example, and a distance between the refractive surface S7 of the convex lens 16 and a front surface of the optical disc 80 (air gap) is made about 0.151 mm as one example.

FIG. 2 and FIG. 3 are explanatory tables of characteristics of the lenses 11, 12, 14, and 16 in FIG. 1.

For example, an axial distance of the refractive surface S1 means the distance on an optical axis LA between the refractive surface S1 and the refractive surface S2 opposite to this refractive surface S1. Similarly, an axial distance of the refractive surface S2 means the distance on the optical axis LA between the refractive surface S2 and the refractive surface S3 opposite to this refractive surface S2.

A radius of curvature of the refractive surface S1 is about 12.527 mm. Addition of a "−" mark indicates that the concerned curved line or curved surface projects downward in FIG. 1.

Variables R, K, and A to G in the refractive surfaces S4 to S6 are coefficients in an aspherical equation shown in the following equation (1). Note that E-2 means $10^{-2}$, E-3 means $10^{-3}$, and similarly E-6 means $10^{-6}$.

$$X=Y^2/[R+R\{1-(1+K)(Y/R)^2\}^{1/2}]+AY^4+BY^6+CY^8+DY^{10}+EY^{12}+FY^{14}+GY^{16} \quad (1)$$

In the above equation (1), X is a depth from the surface vertex. Y is a height from the optical axis. R is a radius of curvature on a paraxis. K is a conical constant.

A is an aspherical coefficient of the term $Y^4$. B is an aspherical coefficient of the term $Y^6$.

C is an aspherical coefficient of the term $Y^8$. D is an aspherical coefficient of the term $Y^{10}$.

E is an aspherical coefficient of the term $Y^{12}$. F is an aspherical coefficient of the term $Y^{14}$.

G is an aspherical coefficient of the term $Y^{16}$.

FIG. 4 is a characteristic graph showing a relation between a difference from the optical axis of the achromatic lens 11, 12 and the object lens 14, 16 and a wavefront aberration.

The wavefront aberration of the case when there is no difference from the optical axis (decentration) is 0.009 λrms. On the other hand, the wavefront aberration of the case when the decentration is 0.2 mm is 0.022 λrms. It is desired to reduce the wavefront aberration.

Figure 5:
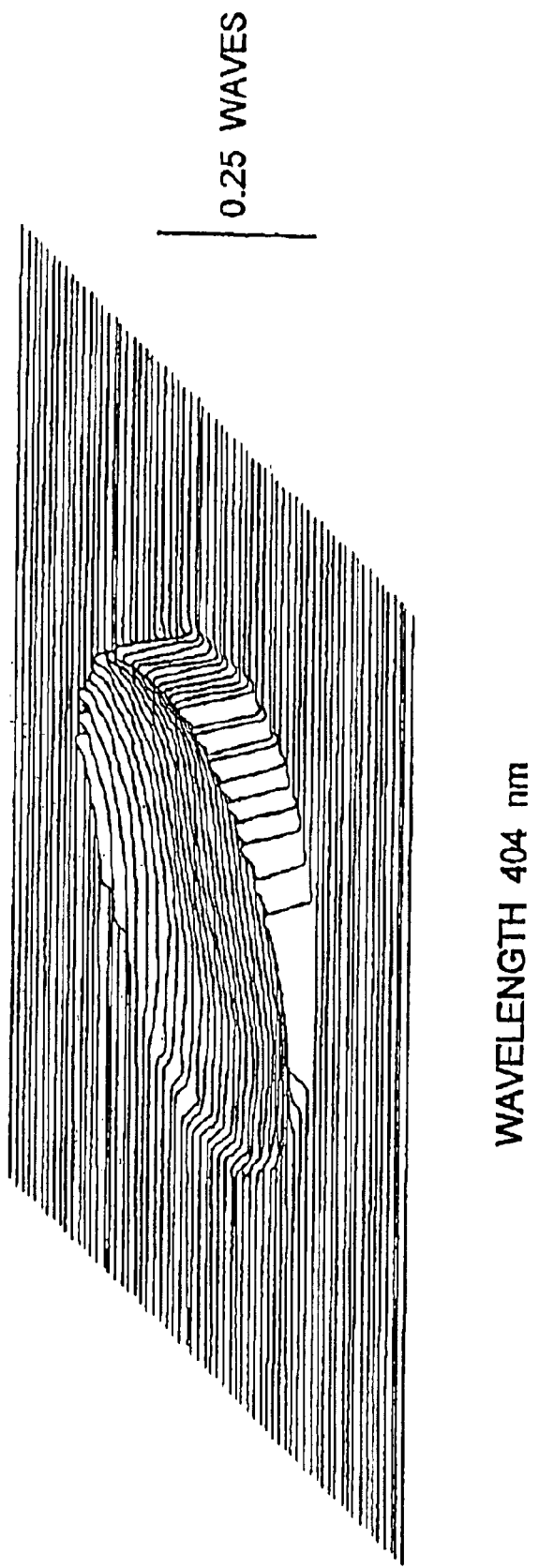
FIG. 5 is a first explanatory view of the wavefront of the same phase of the laser beam when the decentration in the achromatic lens and the object lens in FIG. 1 is 0.2 mm and a schematic wavefront chart when the wavelength of the laser beam is 404 nm.
Figure 6:
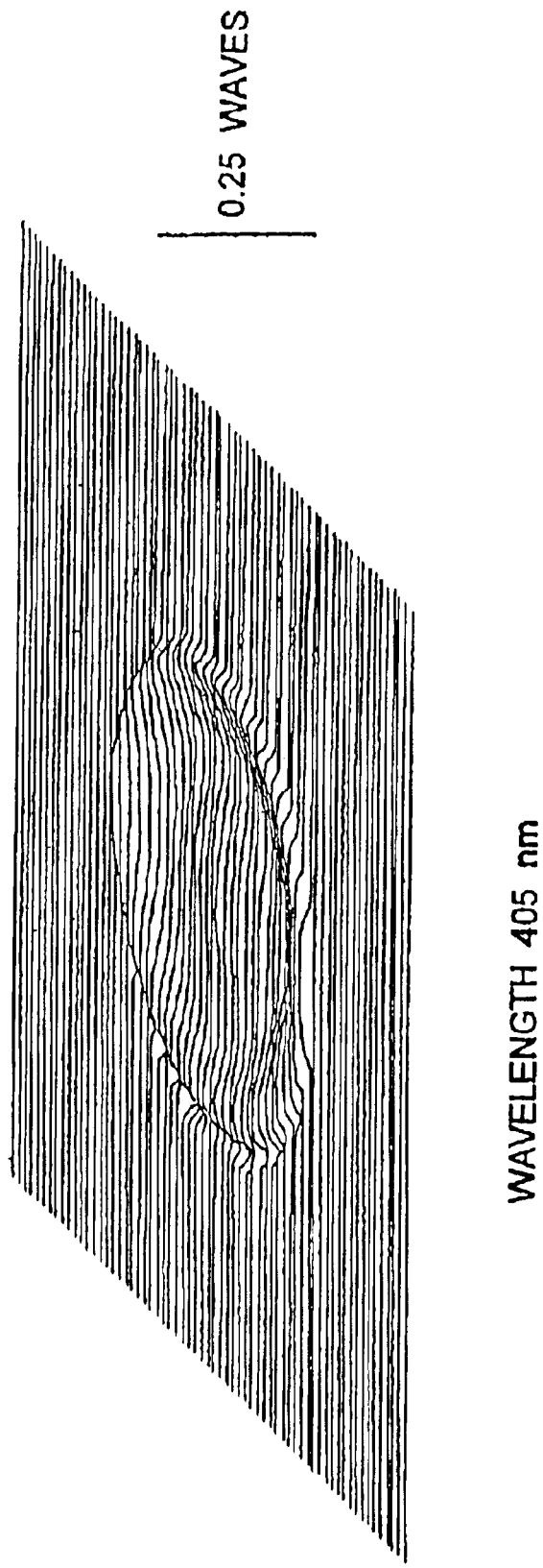
FIG. 6 is a second explanatory view of the wavefront of the same phase of the laser beam when the decentration in the achromatic lens and the object lens in FIG. 1 is 0.2 mm and a schematic wavefront chart when the wavelength of the laser beam is 405 nm.
Figure 7:
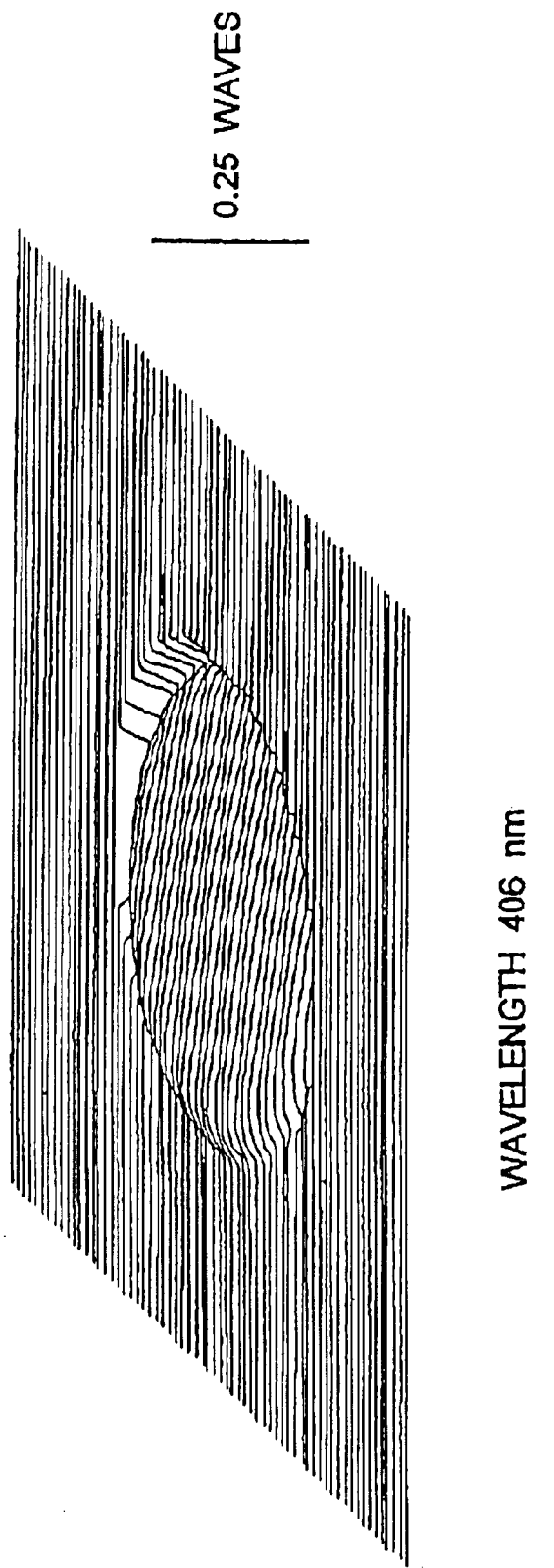
FIG. 7 is a third explanatory view of the wavefront of the same phase of the laser beam when the decentration in the achromatic lens and the object lens in FIG. 1 is 0.2 mm and a schematic wavefront chart when the wavelength of the laser beam is 406 nm.

FIGS. 5 to 7 are explanatory views of the wavefront in the same phase of the laser beam in the case of decentration of 0.2 mm in the achromatic lenses 11, 12 and the object lenses 14, 16. The wavefront is not uniform at the wavelength of 404 nm and 406 nm. It is desired to reduce the decentration.

Note that if only the object lenses 14, 16 are used, when the frequency components 404 nm, 405 nm, and 406 nm of the laser beam LB are 1:1:1, the wavefront aberration of the object lens 14, 16 becomes 0.051 λrms. The laser diode sometimes has a wavelength width of about several nm. Further, the center wavelength sometimes changes by several nm due to a temperature change, that is, mode hopping occurs.

Therefore, use of a combination of the object lenses 14, 16 and the achromatic lenses 11, 12 is preferable.

In the optical head 110, since that the lens holders 18 and 19 hold the achromatic lenses 11, 12 and the object lenses 14, 16 so that their optical axes coincide or substantially coincide, compared with the case where the achromatic lenses 11, 12 and the object lenses 14, 16 are movable in the tracking direction, generation of wavefront aberration based on the decentration can be prevented and it is possible to improve the performance and the reliability of the optical head.

When holding the achromatic lenses 11, 12 and the object lenses 14, 16 by the lens holders 18 and 19, the assembly error can be made not more than 0.1 mm as one example, and it is possible to keep the decentration small.

As one example, by making the total weight of the achromatic lenses 11, 12, the object lenses 14, 16, the lens holders 18 and 19, and the coils 13A and 15A, which form moving parts of the optical head 110, not more than 500 mg and reducing the size and weight of the moving parts, it is possible to improve the servo characteristic of the bi-axial actuators 13T, 15F.

Optical Head 120

Figure 8:
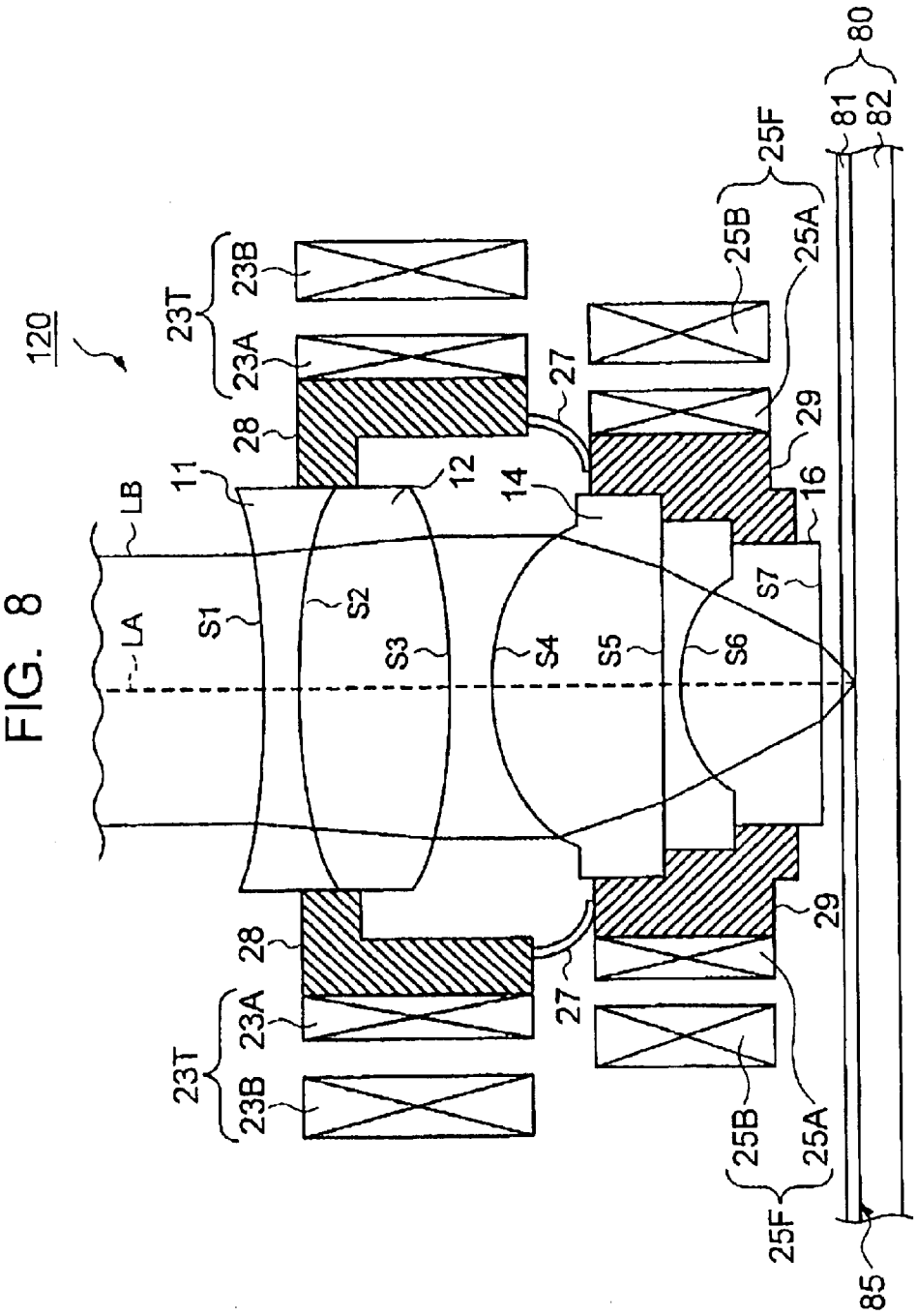
FIG. 8 is a schematic structural view of a second embodiment of the optical head according to the present invention.

FIG. 8 is a schematic structural view of a second embodiment of an optical head according to the present invention.

This optical head 120 has a concave lens 11, convex lenses 12, 14, and 16, a first lens holder 28, a second lens holder 29, a focusing actuator 25F, a tracking actuator 23T, and an elastic member 27. Note that, in the optical head 120 in FIG. 8, structural parts the same as the optical head 110 in FIG. 1 are assigned the same references and descriptions of the same structural parts are omitted appropriately.

The concave lens 11 and the convex lens 12 configure the achromatic lens for correcting chromatic aberration of the object lens and are held by the first lens holder 28.

The convex lenses 14 and 16 configure the object lens and are held by the second lens holder 29. The numerical aperture NA of this object lens is about 0.85.

An elastic member 27 is attached on the bottom surface of the first lens holder 28.

The elastic member 27 is configured by, for example, a plate spring and works to prevent contact and/or collision of the refractive surface S3 of the convex lens 12 with the reflective surface S4 of the convex lens 14. Further, the elastic member 27 works to prevent contact and/or collision of the lens holder 28 with the lens holder 29.

A coil 23A is attached to the outer circumference of the first lens holder 28.

A coil 25A is attached to the outer circumference of the second lens holder 29.

The tracking actuator 23T is configured by the coil 23A and a magnet 23B arranged near this coil 23A in a noncontacting state. By this tracking actuator 23T, the lenses 11, 12, 14, and 16 are moved as one part in the tracking direction of the optical disc 80 for tracking servo.

The focusing actuator 25F is configured by the coil 25A and a magnet 25B arranged near this coil 25A in a noncontacting state. By this focusing actuator 25F, the lenses 14 and 16 are moved as one part in the focus direction perpendicular or substantially perpendicular to the recording surface of the optical disc 80 for focus servo.

By the focusing actuator 25F and the tracking actuator 23T, a bi-axial actuator is configured.

The laser beam LB comprised of parallel light is supplied to the refractive surface S1 of the concave lens 11. In the concave lens 11, the opposite side of the refractive surface S1 is fixed to the surface S2 of the convex lens 12. The wavelength of the laser beam LB is, for example, made 405 nm or substantially 405 nm.

The concave lens 11 passes the laser beam striking it from the refractive surface S1 and supplies it to the refractive surface S2 of the convex lens 12.

The convex lens 12 passes the laser beam striking it from the refractive surface S2, emits the laser beam comprised of parallel light from the reflective surface S3, and supplies this laser beam comprised of parallel light to the refractive surface S4 of the convex lens 14.

The convex lens 14 passes the laser beam striking it from the refractive surface S4, emits it from the refractive surface S5, and supplies the striking laser beam to the refractive surface S6 of the convex lens 16.

The convex lens 16 passes the laser beam striking it from the refractive surface S6, emits it from the flat refractive surface S7, and supplies the striking laser beam to a track of the recording surface 85 of the optical disc 80. Thus, the laser beam LB striking the optical head 120 is condensed on the recording surface 85 of the optical disc 80.

In the optical head 120 in the FIG. 8, the lens holder 28 holds the lenses 11 and 12, the lens holder 29 holds the lenses 14 and 16, and the optical axes of the lenses 11, 12, 14, and 16 coincide or substantially coincide.

Because the focusing actuator 25F is required only to move the lenses 14 and 16 in the focus direction, compared with the case where the lenses 11, 12, 14, and 16 are made to move in the focus direction as one part, the weight of lenses to be moved can be reduced, and it is possible to improve the focus servo characteristic.

Optical Pickup 111

Figure 9:
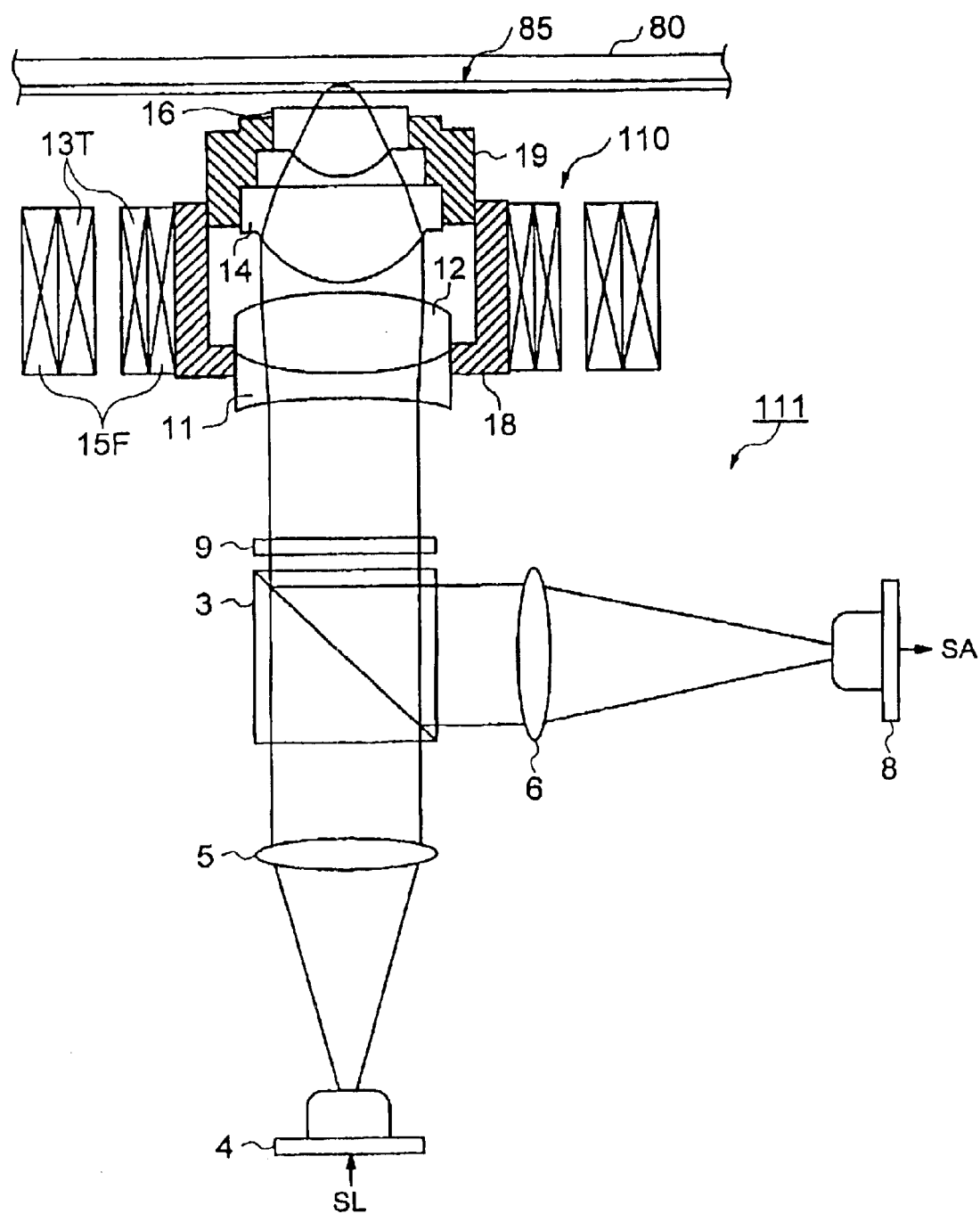
FIG. 9 is a schematic structural view of an optical pickup having the optical head in FIG. 1.

FIG. 9 is a schematic structural view of a first embodiment of an optical pickup having the optical head according to the present invention.

This optical pickup 111 has a laser diode 4, a collimator lens 5, a beam splitter 3, an ¼ wave plate (a λ/4 plate) 9, a condenser lens 6, a photodetector 8, and the optical head 110. A description of the structure of the optical head 110 is omitted because the structure was already explained with reference to FIGS. 1 to 7.

The laser diode 4 outputs a blue or blue-violet laser beam comprised of linearly polarized light in response to a driving signal SL and supplies the output laser beam to the collimator lens 5.

The collimator lens 5 makes the blue or blue-violet laser beam from the laser diode 4 parallel light and supplies it to the beam splitter 3.

The beam splitter 3 passes the laser beam from the collimator lens 5 and supplies the laser beam to the optical head 110 via the ¼ wave plate 9.

In the optical head 110, the achromatic lens 11, 12 passes the laser beam comprised of parallel light from the ¼ wave plate 9 and supplies the laser beam to the object lenses 14, 16. The object lenses 14, 16 condense the passing laser beam from the achromatic lenses 11, 12 and emit it to a track of the optical disc 80, Thus, the laser beam from the laser diode 4 is condensed on the recording surface 85 of the optical disc 80.

For example, a tracking error signal (or a phase compensated and/or frequency compensated signal of the tracking error signal) is supplied to the tracking actuator 13T of the optical head 110 for tracking control.

For example, a focus error signal (or a phase compensated and/or frequency compensated signal of the focus error signal) is supplied to the focusing actuator 15F of the optical head for focus control.

Further, the optical head 110 returns the laser beam reflected at the optical disc 80 to the beam splitter 3 via the ¼ wave plate 9.

The beam splitter 3 is struck by the laser beam from the optical head 110 (returned laser beam). The beam splitter 3 reflects the striking laser beam and supplies it to the condenser lens 6.

The condenser lens 6 supplies the laser beam from the beam splitter 3 to the photodetector 8 and condenses the laser beam on a receiving surface (or a receiving part).

The photodetector 8 receives the laser beam from the condenser lens 6 at the receiving part and generates an output signal SA. The photodetector 8 is configured by, for example, a quadratic photodetector.

In the above optical pickup 111, since the optical head 110 is structured so that the achromatic lens and the object lens are held by the lens holders 18 and 19 and moved as one part, the decentration among lenses can be reduced, aberration can be reduced, and high density storage and reproduction are possible.

Optical Pickup 121

Figure 10:
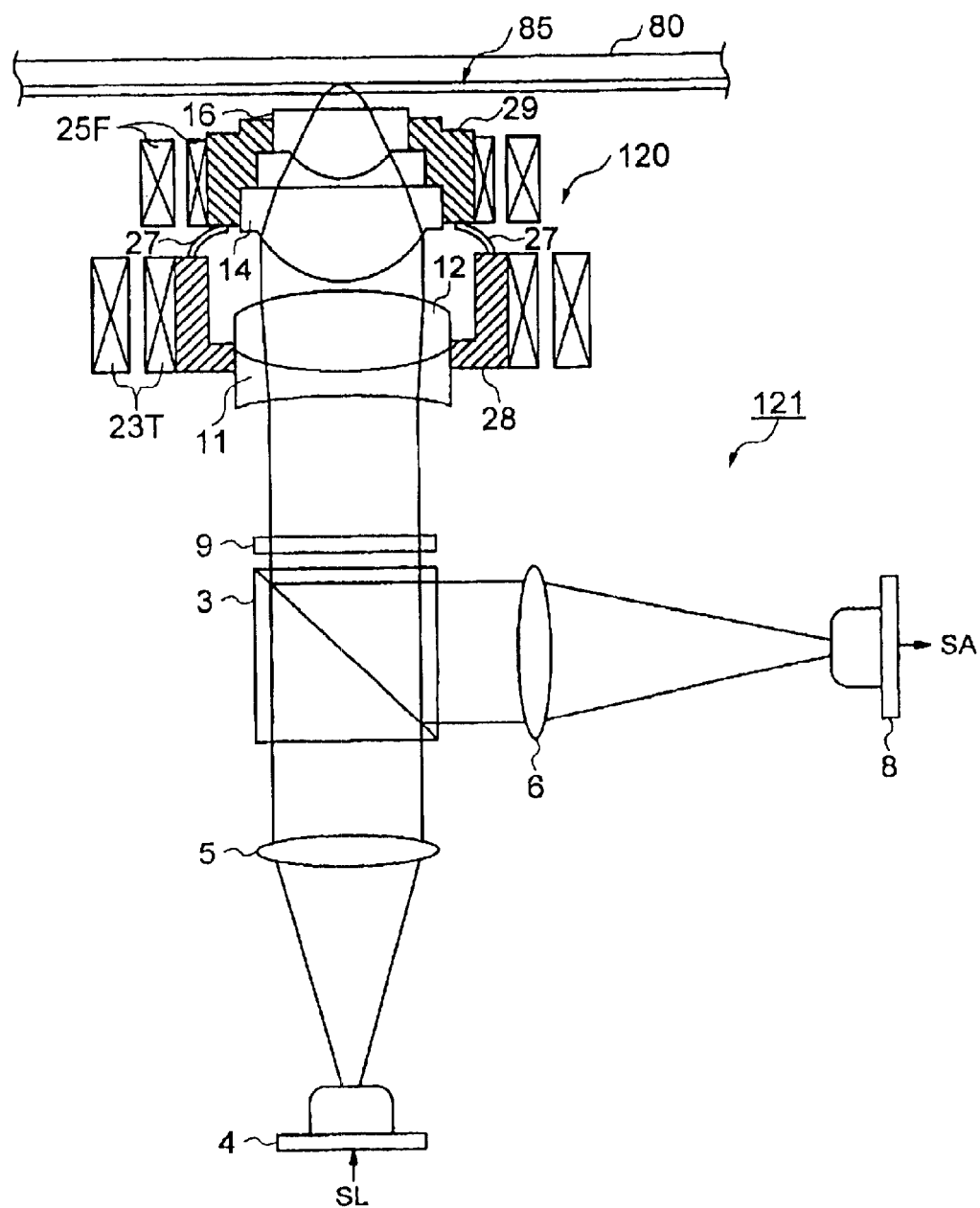
FIG. 10 is a schematic structural view of an optical pickup having the optical head in FIG. 8.

FIG. 10 is a schematic structural view of a second embodiment of an optical pickup having the optical head according to the present invention.

This optical pickup 121 has a laser diode 4, a collimator lens 5, a beam splitter 3, a ¼ wave plate (the λ/4 plate) 9, a condenser lens 6, a photodetector 8, and an optical head 120. A description of the structure of the optical head 120 is omitted because the structure was already explained with reference to FIG. 8.

The laser diode 4 outputs a blue or blue-violet laser beam comprised of linearly polarized light in response to a driving signal SL and supplies the output laser beam to the collimator lens 5.

The collimator lens 5 makes the blue or blue-violet laser beam from the laser diode 4 parallel light and supplies it to the beam splitter 3.

The beam splitter 3 passes the laser beam from the collimator lens 5 and supplies the laser beam to the optical head 120 via the ¼ wave plate 9.

In the optical head 120, the achromatic lenses 11, 12 pass the laser beam comprised of parallel light from the ¼ wave plate 9 and supplies the laser beam to the object lenses 14, 16. The object lenses 14, 16 condense the passing laser beam from the achromatic lenses 11, 12 and emit it to a track of the optical disc 80. Thus, the laser beam from the laser diode 4 is condensed on the recording surface 85 of the optical disc 80.

For example, a tracking error signal (or a phase compensated and/or frequency compensated signal of the tracking error signal) is supplied to the tracking actuator 23T of the optical head 120 for tracking control.

For example, a focus error signal (or a phase compensated and/or frequency compensated signal of the focus error signal) is supplied to the focusing actuator 25F of the optical head for focus control.

Further, the optical head 120 returns the laser beam reflected at the optical disc 80 to the beam splitter 3 via the ¼ wave plate 9.

The beam splitter 3 is struck by the laser beam from the optical head 120 (returned laser beam). The beam splitter 3 reflects the striking laser beam and supplies it to the condenser lens 6.

The condenser lens 6 supplies the laser beam from the beam splitter 3 to the photodetector 8 and condenses the laser beam to the receiving surface (or a receiving part).

The photodetector 8 receives the laser beam from the condenser lens 6 at the receiving part and generates the output signal SA. The photodetector 8 is configured by, for example, a quadratic photodetector.

In the above optical pickup 121, since the optical head 120 is structured so that the achromatic lens and the object lens move in the tracking direction as one part, decentration between lenses can be reduced, aberration can be reduced, and high density storage and reproduction become possible.

In the above optical pickup 121, since the optical head 120 is structured to hold the achromatic lens by the lens holder 28, hold the object lens by the lens holder 29, and make the object lens movable in the focus direction, the accuracy of the focus control can be improved and thus it is possible to store and reproduce at a high density.

Note that, in the optical head 120, it is also possible to structured it to form a slide mechanism by connecting the lens holders 28 and 29 via an axial rod or a guide rod extending in the focus direction, to more the lens holders 28 and 29 in the tracking direction as one part, and to move the lens holder 29 along the axial rod or the guide rod relative to the lens holder 28.

Further, in the optical heads 110 and 120, the convex lens 14 and the convex lens 12 face each other, but it is also possible to reverse the convex lens 12 and concave lens 11 and make the concave lens 11 and the convex lens 14 face each other. By doing this, it is possible to further reduce the size of the optical head.

Further, the above embodiments are examples of the present invention. The present invention is not limited to the above embodiments.

As described above, according to the present invention, it is possible to provide an optical head having an achromatic lens and to provide an optical pickup having this optical head.

Note that the present invention is not limited to the above embodiments and includes modifications within the scope of the claims.

What is claimed is:

1. An optical head comprising:
   an achromatic lens which a laser beam strikes;
   an object lens for condensing the laser beam passing through said achromatic lens on an optical disc;
   a lens holder for holding said achromatic lens and said object lens so that their optical axes coincide; and
   an actuator for moving said lens holder which holds said achromatic lens and said object lens in a focus direction and tracking direction of said optical disc.

2. An optical head as set forth in claim 1, wherein:
said lens holder comprises
a first lens holder for holding said achromatic lens and
a second lens holder for holding said object lens, and
said first and second lens holders are fixed to each other so that optical axes of said achromatic lens and said object lens coincide or substantially coincide.

3. An optical head as set forth in claim 1, wherein said laser beam striking said achromatic lens is a blue or blue-violet laser beam output from a laser diode.

4. An optical pickup comprising:
a laser;
an optical head for condensing a laser beam from said laser on an optical disc; and
a photodetector for receiving said laser beam reflected at said optical disc, wherein
said optical head comprises:
an achromatic lens which said laser beam from said laser strikes;
an object lens for condensing said laser beam passing through said achromatic lens on said optical disc;
a lens holder for holding said achromatic lens and said object lens so that their optical axes coincide; and
an actuator for moving said lens holder which holds said achromatic lens and said object lens in a focus direction and tracking direction of said optical disc.

5. An optical pickup as set forth in claim 4, wherein:
said lens holder comprises
a first lens holder for holding said achromatic lens and
a second lens holder for holding said object lens, and
said first and second lens holders are fixed to each other so that optical axes of said achromatic lens and said object lens coincide or substantially coincide.

6. An optical pickup as set forth in claim 4, wherein said laser is a laser diode generating a blue or blue-violet laser beam.

* * * * *